United States Patent [19]

Von Kemenczky

[11] 4,063,671
[45] Dec. 20, 1977

[54] FILM ADVANCING MECHANISM

[75] Inventor: Miklos Von Kemenczky, Greenbrook, N.J.

[73] Assignee: Paul Guilden, New York, N.Y.

[21] Appl. No.: 757,603

[22] Filed: Jan. 7, 1977

[51] Int. Cl.² .............................................. G03B 1/24
[52] U.S. Cl. ....................................... 226/76; 353/95; 226/145; 352/187
[58] Field of Search .................... 353/95, 96; 352/169, 352/187; 226/76, 145, 156

[56] References Cited
U.S. PATENT DOCUMENTS

| 3,418,045 | 12/1968 | Rousek | 353/95 X |
| 3,954,214 | 5/1976 | Kemenczky | 352/187 |

Primary Examiner—Harry N. Haroian
Attorney, Agent, or Firm—Watson, Leavenworth, Kelton & Taggart

[57] ABSTRACT

The sprocket assembly for periodic advancement of film in a film projector is supported axially between rotated members and is corotative with the members upon increase in axial force therebetween. One of the members is axially restrained and the second member supported for minute axial movement. Force giving rise to the corotation of the members and sprocket assembly is applied to the second member by selective movement of a magnetically attractable element into a magnetic field generated continuously during projector use.

16 Claims, 5 Drawing Figures

FILM ADVANCING MECHANISM

FIELD OF THE INVENTION

This invention relates generally to film projectors and more particularly to apparatus for intermittently advancing film to dispose individual film frames in a registration position for projection thereof.

BACKGROUND OF THE INVENTION

Presently known arrangements providing for intermittent advance of motion picture film for projection of film frames are of mechanical variety on the one hand involving claw-type feeding mechanisms, so-called maltese cross feeding mechanisms, or mechanisms of type illustrated in commonly-assigned U.S. Pat. No. 3,806,246. Such known arrangements are of electromechanical variety, on the other hand, such as shown in U.S. Pat. No. 2,994,247, involving electromagnetically operated ratchet mechanisms, or in U.S. Pat. No. 1,888,094, wherein a sprocket assembly is rotated by magnetic coupling thereof to a rotatively driven selectively energized solenoid. Of such known arrangements, the structurally least complex is considered to be that of the referenced commonly-assigned patent, involving axially spaced driven members continuously biased into engagement with a sprocket assembly disposed therebetween with a stop member selectively engaging the sprocket assembly to arrest its rotation.

Apparatus disclosed in a further commonly-assigned patent, U.S. Pat. No. 3,954,214, simplifies the above-discussed arrangements in disposing the film-advancing sprocket between axially-spaced driven members selectively biased into engagement with the sprocket. In its preferred form, such '214 patent includes an electromagnet providing such selective bias condition when energized, the electromagnet being deenergized for film stoppage upon engagement of electrically-conductive sprocket teeth with a cyclically-moved electrically conductive follower element.

SUMMARY OF THE INVENTION

The present invention has as its primary object an improvement of such presently known apparatus by avoidance of the need for complex mechanisms and reduction of friction losses particularly as occur in the aforesaid mechanical variety of apparatus considered least complex and by simplifying the referenced electromechanical variety.

A more particular object of the invention is to provide improvements in apparatus of the type disclosed in said first-mentioned commonly-assigned patent for reducing friction losses between rotative members and a sprocket assembly selectively rotated therewith.

A still further object of the invention is to provide for noise reduction in film projectors.

In attaining these objects, the invention provides apparatus wherein a film advancing sprocket assembly is supported between axially spaced continuously rotated first and second members such that the members may rotate relative to the sprocket assembly during periods in which the sprocket assembly is stationary and film frames are disposed in registration position and being projected, and wherein translator means provides for frictional engagement between the members and the sprocket assembly of magnitude giving rise to corotation of the sprocket assembly therewith selectively during periods in which the film is to be advanced.

The foregoing and other objects and features of the invention will be evident from the following detailed description of preferred embodiments thereof and from the drawings wherein like reference numerals identify like parts throughout.

DETAILED DESCRIPTION OF PREFERRED EMBODIMENTS

Figure 1:
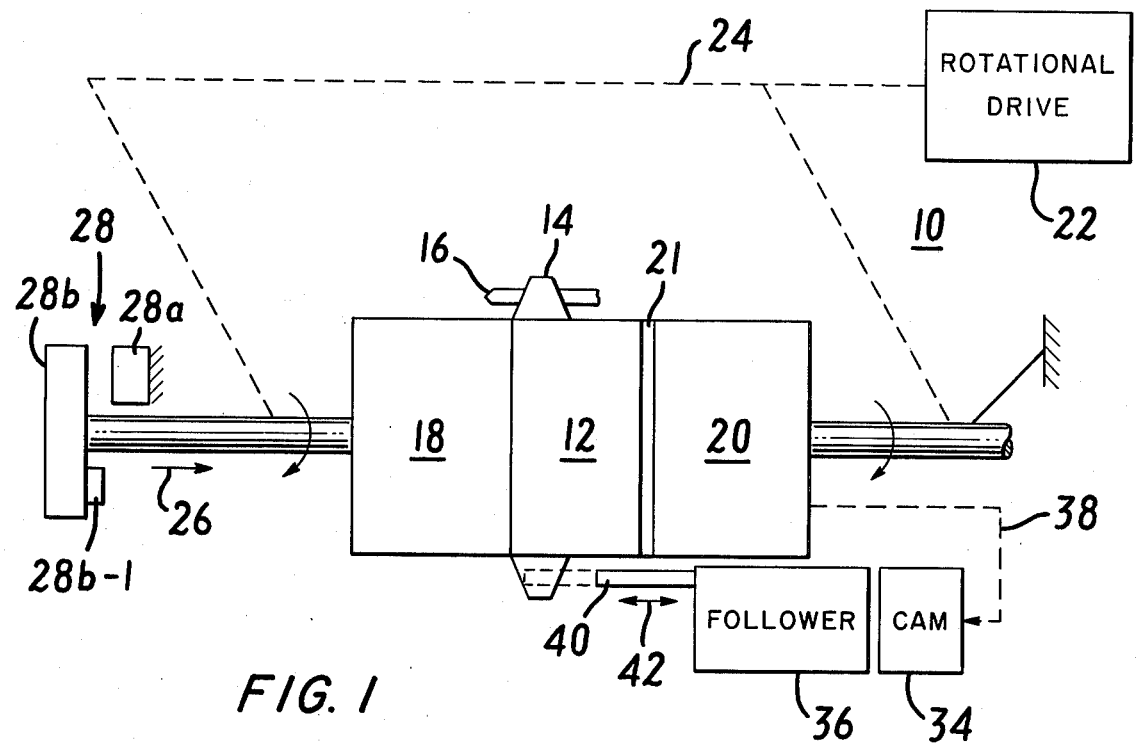
FIG. 1 is a block diagram of film projector apparatus in accordance with the invention.

Referring to FIG. 1, film projector apparatus 10 includes sprocket assembly 12 having peripheral teeth 14, enterable in drive slots in film 16 for transporting frames thereof into an optical projecting system (not shown). Sprocket assembly 12 is supported for rotation about an axis about which first and second opposed members 18 and 20 are also supported for rotation. Members 18 and 20 are connected to rotary drive 22 by linkage 24 and are rotated continuously thereby during projector use at common rotational speed with like rotative sense. Member 20 is restrained against axial, i.e., translational or left-right movement in FIG. 1, as indicated by fixed axial arrangement thereof with respect to the projector housing. A friction plate 21 is disposed between member 20 and sprocket assembly 12. Member 18, on the other hand, is supported in projector apparatus 10 in axially unrestrained manner and, under direction of translator 28, has axial force applied thereto as indicated by arrow 26.

Translator 28 includes a magnetic field generator 28a fixedly supported in the projector, providing a magnetic field continuously during projector use, for example, a permanent magnet or electromagnet energized by the projector on-off switch. Part 28b of translator 28 is supported for rotation by drive 22 and includes a magnetically-attractable element 28b-1, movable selectively into the magnetic field established by generator 28a in the course of such rotation of part 28b. On such movement of element 28b-1 into the magnetic field, it is attracted to generator 28a and displaces part 28b rightwardly in FIG. 1, whereupon member 18 applies axial force to sprocket assembly 12 whereby the same is frictionally engaged between member 18 and plate 21 and rotates therewith. Other than during such periods when element 28b-1 is situate in the magnetic field, member 18 and plate 21 do not frictionally engage sprocket assembly 12 in a manner imparting corotation thereto, but rotate relative to the then restrained sprocket assembly 12, and a film frame is accordingly then fixedly stationed in the optical projecting system.

Member 20 serves as a rotative drive source for cam 34 and follower 36 as indicated schematically in FIG. 1 by fixed connection 38 between member 20 and cam 34. Follower 36 supports a rigid stop element 40 for cyclic axial reciprocating movement, as indicated by arrow 42 in FIG. 1, in accordance with the angular position of member 20. Stop element 40 is thus cyclically displaceable upon continuous rotation of member 20 from a first position (FIG. 1 solid line showing) to a second position (FIG. 1 broken line showing). In such second position, element 40 is situated in the rotative path of movement of sprocket teeth 14.

Figure 2:
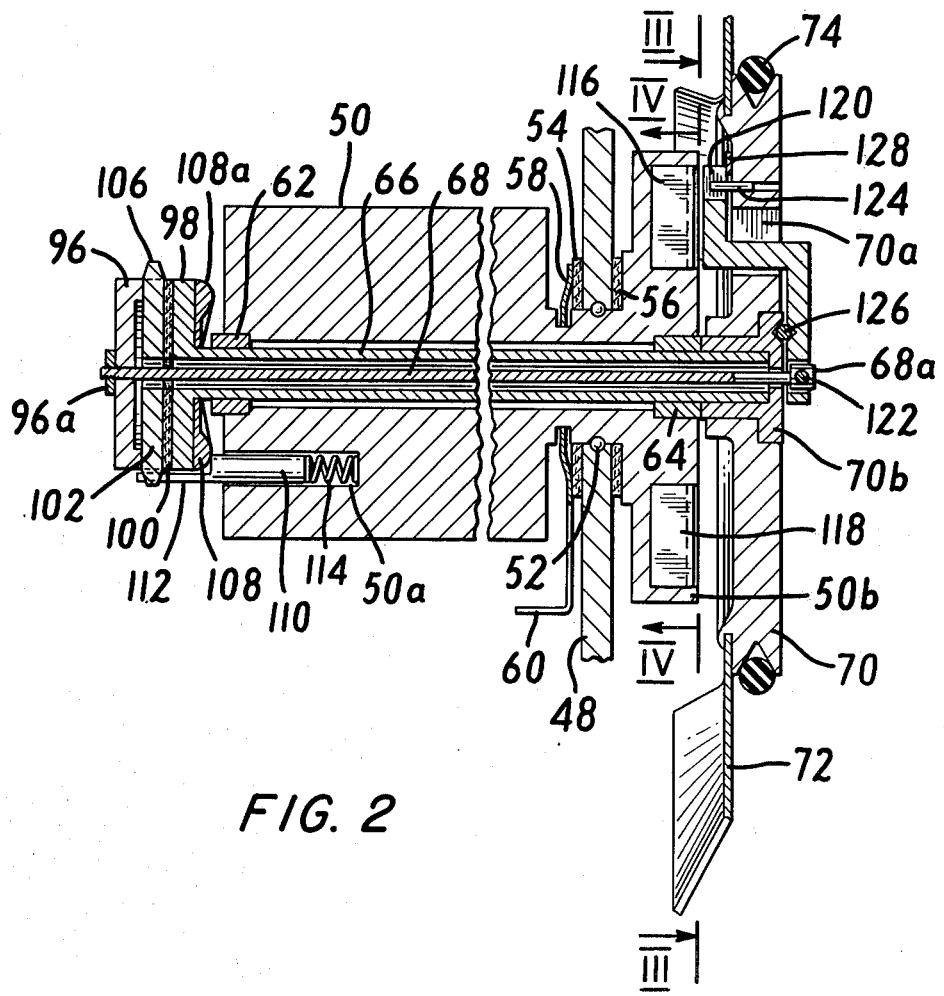
FIG. 2 is a side elevation in section of the particularly preferred embodiment of an assembly of parts useful in implementing the FIG. 1 block diagram.

Referring now to the assembly of parts in FIG. 2, upright wall 48 is rigidly supported and has an opening in which is seated cylindrical housing 50. Resilient ring 52 encircles a portion of housing 14 extending through such wall 48 opening and vibration absorbing pads 54 and 56, e.g., of felt or the like, encircle portions of housing 50 immediately adjacent opposite sides of wall 48. Spring member 58 engages housing 50 and pad 54, effective to provide for secure support of housing 50 by wall 48. Spring member 58 is preferably in the form of a fork having handle 60, movement of the handle inwardly or outwardly of the plane of FIG. 1 enabling selective rotative positioning of housing 50 relative to wall 48 for framing.

Housing 50 defines a central axial bore therethrough, opposite ends of which support bushings 62 and 64, which in turn provide rotative support for shaft 66. Shaft 66 also defines a central axis bore therethrough in which is disposed shaft 68.

At one end thereof shaft 66 is secured to hub 70b of pulley 70 such that the shaft and pulley are corotative. Pulley 70 supports customary shutter disc 72 and is rotatively driven by drive means including belt 74 continuously driven during use of the projector. Shaft 68 supports member 96, counterpart to member 18 of FIG. 1, for corotation therewith, this shaft 68 end being exteriorly threaded for receiving securing nut 96a. At its leftward end, shaft 66 supports member 98, counterpart to member 20 of FIG. 1, which may be an integral part of shaft 66. Member 98 is juxtaposed with plate 100, counterpart to friction plate 21 of FIG. 1 and comprised of rubber, plastic, paper or similar sheet material having an asbestos filler and exhibiting opposed surfaces of high friction coefficient. A rubber-asbestos friction plate of 10 mils thickness is preferred. Sprocket 102, counterpart to member 12 of FIG. 1, has peripheral teeth 106 adapted for engaging film slots and is disposed between member 96 and plate 100.

Member 98 has rigidly secured thereto, or formed integrally therewith, cam plate 108 defining cam surface 108a. Cam follower 110 is supported in axial recess 50a of housing 50 and in turn supports stop element 112 at the leftward end thereof. Spring 114 biases follower 110 into engagemnet with cam surface 108a. Upon rotation of member 98 and cam plate 108, surface 108a subjects follower 110 to cyclic axial reciprocating movement from its illustrated position, wherein stop element 112 is disposed out of the path of rotation of sprocket teeth 106, to a leftward position, wherein follower 110 moves outwardly of recess 50a and stop element 112 is situated in the path of travel of sprocket teeth 106.

Figure 4:
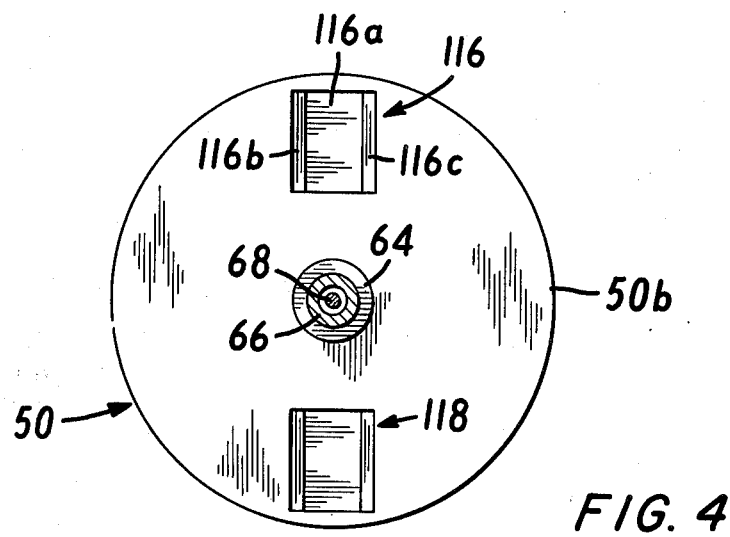
FIG. 4 is a view of the FIG. 2 assembly as seen looking to the left of plane III—III of FIG. 2.

At its rightward end 50b, housing 50 supports permanent magnets 116 and 118 in facing relation to the leftward side of pulley 70, such magnets preferably being of sandwich variety, comprising a rubber magnet 116a (FIG. 4) disposed between soft iron pole pieces 116b and 116c. Such magnets are counterpart to magnetic field generator 28a of FIG. 1 and each defines a magnetic field extending rightwardly outwardly of housing 50. A magnetically-attractable element 120, of soft ferromagnetic material, is selectively movable into such magnetic fields as is now discussed.

Figure 5:
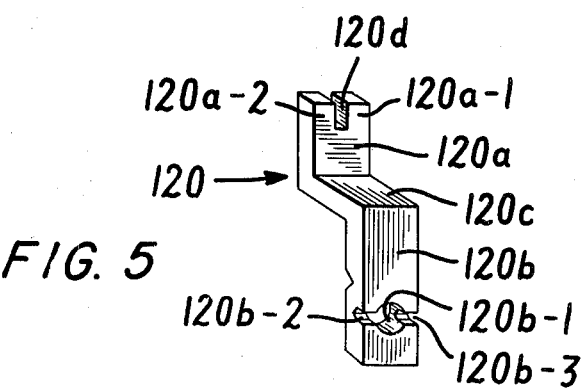
FIG. 5 is a perspective view of the magnetically-attractable element of the FIG. 2 assembly.

Referring to FIG. 5, element 120 has a first end portion 120a, a second end portion 120b opposite portion 120a and an intermediate portion 120c. Portion 120a is bifurcated into legs 120a-1 and 120a-2 to define a slot 120d. Portion 120b has aperture 120b-1 for receiving member 68 and transverse slots 120b-2 and 120b-3 for receiving pin 122 which extends through a slot in member 68 (FIG. 2) aligned with openings in head 68a of shaft 68.

Figure 3:
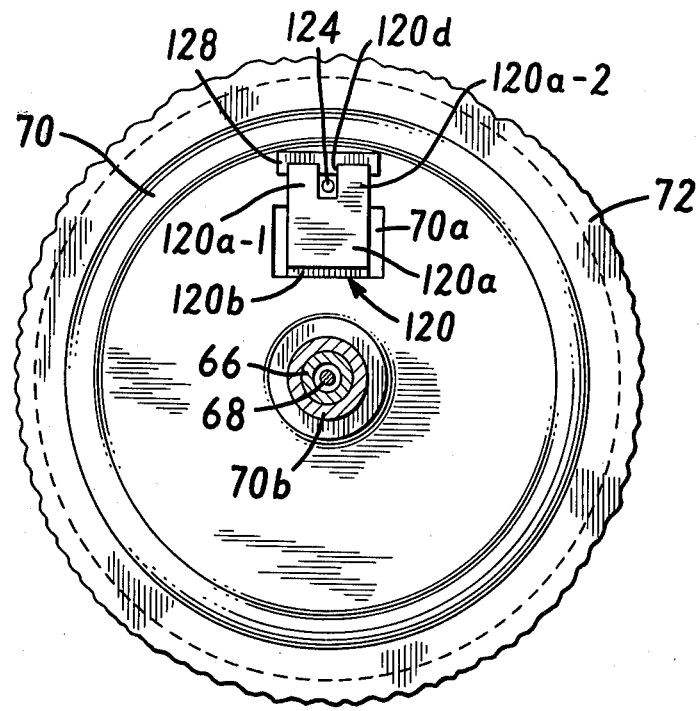
FIG. 3 is a view of the FIG. 2 assembly as seen looking to the right of plane III—III of FIG. 2.

As shown in FIGS. 2 and 3, element 120 extends through opening 70a in pulley 70 with end portion 120a leftwardly of the pulley, portion 120c situate in slot 70a, and end portion 120b juxtaposed with the rightward side of pulley 70. Head 68a is placed in aperture 120b-1. Pin 122 is then run through transverse slot 120b-2, head 68a and transverse slot 120b-2. Keying pin 124 of nonmagnetic material secured to pulley 70, is resident in slot 120d whereby element 120 rotates with pulley 70 and, by pin 122, imparts rotation also to member 68. As above noted, pulley hub 70b engages member 66 for rotation thereof. The rightward side of hub 70b and the facing leftward side of end portion 108b are notched as shown in FIG. 2 with pivot member 126 seated in the notch.

As pulley 70 rotates, element 120 will selectively enter the magnetic fields generated by magnets 116 and 118 whereupon end portion 120a of element 120 is attracted to the confronting magnet and pivots counterclockwise (FIG. 2) about pivot member 126. Such pivotal movement of element 120 applies rightward pulling pressure to member 68 whereby sprocket 102 is driven by member 96 against friction plate 100 and member 98, advancing film engaged by sprocket teeth 106. In the course of pulley rotation at this juncture, element 120 is rotated out of the magnetic field and pivots clockwise (FIG. 2) to its rest position against felt pad 128. As will be noted in FIG. 2, surface 108a of cam plate 108 has two high cam portions arranged so as to free sprocket teeth 106 from stop element 112 as magnetically-attractable element 120 enters the fields of magnets 104 and 106.

In providing for variation in axial forces and consequent increases in pressure giving rise to selective corotation of sprocket 102 with members 96 and 98, structure is provided for supporting axial displacement of member 96. It is to be appreciated, however, that quite minimal and virtually immeasurable axial translation of shaft 68 and its member 96 achieves the necessary increase in pressure and mutual friction between member 96, sprocket 102, plate 100 and member 98 to provide for corotation thereof. In this connection, actual movement of member 96 may not be of extent giving rise to such axial movement of sprocket 102 as would cause lateral movement of film observable in projection thereof. The shutter is effective in blocking light during film transport.

Housing 50 is of large mass and is comprised of material having low sound conductivity, for example, lead or zinc. Felt pads 54 and 56 serve to acoustically insulate housing 50 from upright wall 48 of the projector. Accordingly, housing 50 effectively absorbs the noise generated in operation of the FIG. 2 assembly, particularly the noise generated by the cyclic engagement of stop element 112 and sprocket teeth 106. Further, felt pad 118 deadens sound generated by movements of element 108.

Various modifications and changes now made evident to those skilled in the art may be introduced in the foregoing particularly disclosed embodiments of the invention without departing from the scope thereof. For example, in the illustrated embodiment, the magnetically-attractable element is shown as being rotated and the permanent magnet fixed. The invention contemplates the converse situation wherein the magnetically-attractable element may be fixed and the permanent magnet rotated. As will be appreciated, the invention requires no more than relative movement of the permanent magnet and magnetically-attractable element. The particularly disclosed embodiments are thus intended in a descriptive and not in a limiting sense. The true spirit and scope of the invention is set forth in the following claims.

What is claimed is:

1. In combination, in a film projector:
   a. drive means continuously operative during projector use;
   b. first and second members each rotated by said drive means about a common axis at common rotational speed, said first and second members being axially spaced from one another, said first member being supported for axial translation toward said second member;
   c. film advancing sprocket means supported axially between said first and second members and rotated thereby upon said axial translation of said first member;
   d. first means for generating a magnetic field continuously during projector use; and
   e. second means influenced by said magnetic field for imparting said axial translation to said first member, said first and second means being relatively movable to provide selective disposition of said second means in said magnetic field.

2. The invention claimed in claim 1 wherein said first means comprises a permanent magnet fixedly supported in said projector.

3. The invention claimed in claim 2 wherein said second means comprises a magnetically-attractable element supported for rotation into juxtaposition with said permanent magnet.

4. The invention claimed in claim 3 wherein said magnetically-attractable element includes a first end portion movable into juxtaposition with said permanent magnet and a second end portion opposite said first end portion and secured to said first member, said projector supporting said element for pivotal movement about a pivot location between said first and second end portions thereof.

5. The invention claimed in claim 4 wherein said drive means includes a pulley rotated continuously during projector use, said magnetically-attractable element being keyed to said pulley so as to rotate therewith.

6. The invention claimed in claim 5 wherein said permanent magnet is supported in facing relation to one side of said pulley, said first end portion of said magnetically-attractable element being juxtaposed with said pulley one side.

7. The invention claimed in claim 6 wherein said second end portion of said magnetically-attractable element is juxtaposed with the side of said pulley opposite said pulley one side, said pulley defining an opening therein for passage of said element therethrough.

8. The invention claimed in claim 3 further including stop means engageable with said sprocket means and means for discontinuing such engagement thereof upon movement of said magnetically-attractable element into juxtaposition with said permanent magnet.

9. The invention claimed in claim 8 further including a second permanent magnet situated diametrically opposite said first-mentioned permanent magnet about said common axis.

10. The invention claimed in claim 3 wherein said drive means includes a pulley supporting said magnetically-attractable element for corotation therewith, a second shaft having one end fixedly connected to said pulley and a second end supporting said second member, said second shaft defining an axial bore therethrough, a first shaft disposed in said second shaft axial bore and having one end extending interiorly of said pulley and connected to said magnetically-attractable element and an opposite end supporting said first member.

11. The invention claimed in claim 10 further including a sound-absorbent housing defining an axial bore therethrough and supporting said second shaft for rotation therein.

12. The invention claimed in claim 1 wherein said sprocket means comprises a sprocket and a friction plate disposed successively axially between said first and second members, said members, said sprocket and said plate being corotative upon said translation of said first member toward said second member.

13. In combination, in a film projector:
   a. drive means comprising a pulley continuously rotated during projector use and first and second coaxial shafts corotative with said pulley at common rotational speed, said first shaft being supported for axial translation relative to said second shaft;
   b. first and second members respectively axially spacedly supported by said first and second shafts for rotation therewith;
   c. film advancing sprocket means supported axially between said first and second members and rotated thereby upon said axial translation of said first shaft;
   d. first means for generating a magnetic field continuously during projector use; and
   e. second means selectively movable into said magnetic field and influenced thereby for imparting said axial translation to said first shaft.

14. The invention claimed in claim 13 wherein said first means comprises a permanent magnet fixedly supported in said projector.

15. The invention claimed in claim 14 wherein said second means comprises a magnetically-attractable element supported for rotation into juxtaposition with said permanent magnet.

16. In combination, in a film projector:
   a. drive means continuously operative during projector use;
   b. first and second axially spaced members rotated by said drive means at common rotational speed;
   c. film advancing sprocket means supported axially between such first and second members and rotated thereby upon reduction of such axial spacing between said first and second members; and
   d. means for reducing said axial spacing between said first and second members comprising first means for generating a magnetic field continuously during projector use and second means selectively registrable with said first means and influenced by said magnetic field to effect relative axial displacement of said first and second members.

* * * * *